United States Patent [19]

Takeyama et al.

[11] Patent Number: 5,059,987
[45] Date of Patent: Oct. 22, 1991

[54] SYNCHRONIZING SIGNAL GENERATING SYSTEM

[75] Inventors: Yoshinobu Takeyama, Kawasaki; Susumu Imakawa, Yokohama, both of Japan

[73] Assignee: Ricoh Company, Ltd., Tokyo, Japan

[21] Appl. No.: 504,883

[22] Filed: Apr. 5, 1990

[30] Foreign Application Priority Data

| Apr. 11, 1989 | [JP] | Japan | 1-91535 |
| May 23, 1989 | [JP] | Japan | 1-129833 |
| May 23, 1989 | [JP] | Japan | 1-129834 |
| May 24, 1989 | [JP] | Japan | 1-130953 |
| Feb. 1, 1990 | [JP] | Japan | 2-22478 |

[51] Int. Cl.$^5$ .......................... G01D 15/16; H04N 1/21
[52] U.S. Cl. ...................................... 346/108; 358/296
[58] Field of Search ................. 346/108, 107 R, 160; 358/296, 300, 302, 481, 494; 250/235, 237 R, 237 G

[56] References Cited

U.S. PATENT DOCUMENTS

| 2,389,403 | 11/1945 | Arnold | 250/86 |
| 4,837,588 | 6/1989 | Imakawa et al. | 346/108 |
| 4,962,431 | 10/1990 | Imakawa et al. | 346/108 |

FOREIGN PATENT DOCUMENTS

| 97050 | 7/1979 | Japan. |
| 10967 | 1/1985 | Japan. |
| 75168 | 4/1985 | Japan. |
| 66465 | 4/1986 | Japan. |
| 66466 | 4/1986 | Japan. |
| 234630 | 9/1988 | Japan. |

Primary Examiner—Mark J. Reinhart
Attorney, Agent, or Firm—Cooper & Dunham

[57] ABSTRACT

A synchronizing signal generating system for a laser scanner comprises a source for emitting a first laser beam for scanning and a second laser beam for synchronization of scans by the first laser beam, a deflector for causing a scan of a medium by the first laser beam and a scan of a grating by the second laser beam, a converging optical system for converging the second laser beam transmitted through the grating, a light receiving system for receiving the second laser beam converged by the converging optical system and for generating a reference pulse signal, a circuit for controlling the source responsive to the reference pulse signal so as to synchronize a scan timing of the first laser beam and comprising a PLL circuit for generating a synchronizing signal which has a frequency N times a frequency of the reference pulse signal in response to the reference pulse signal and a control circuit for controlling a value of N depending on the recording density, and a driving circuit for driving the source of synchronism with the synchronizing signal depending on input information data.

17 Claims, 11 Drawing Sheets

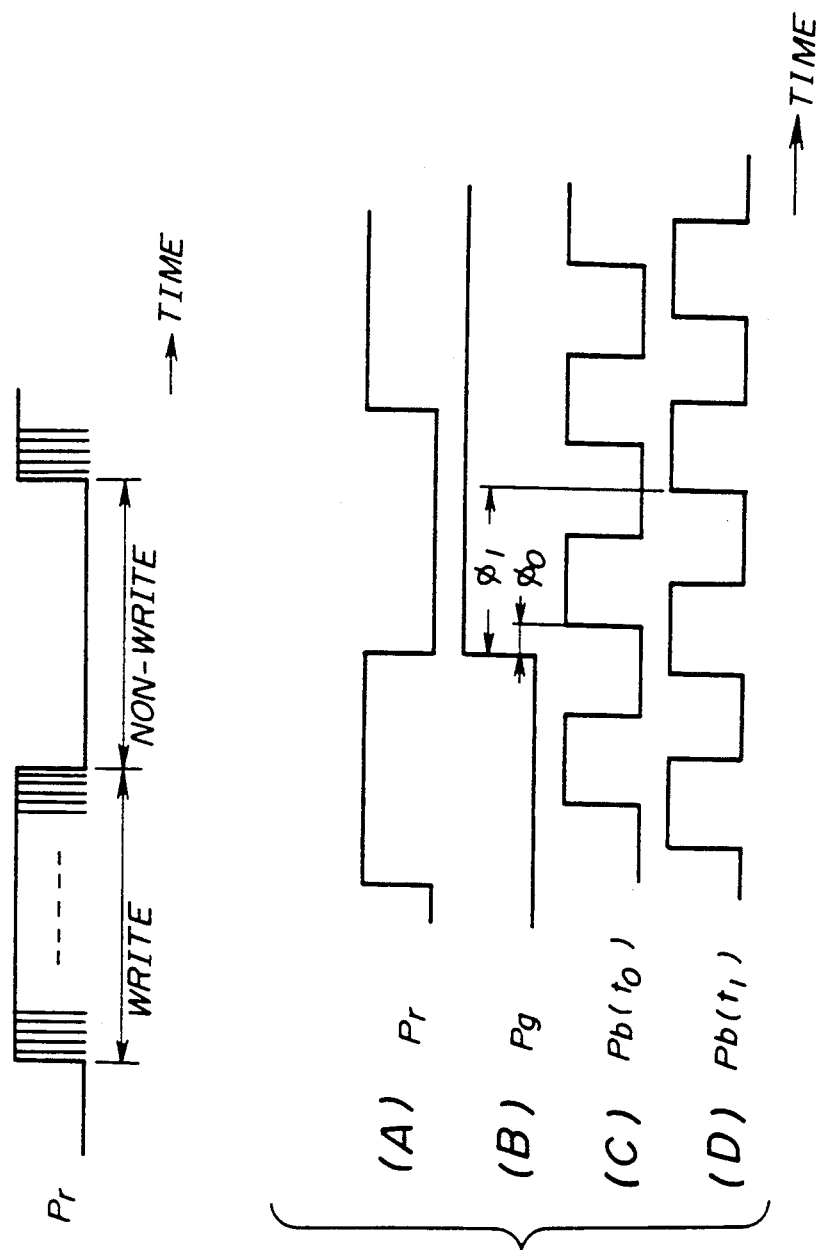

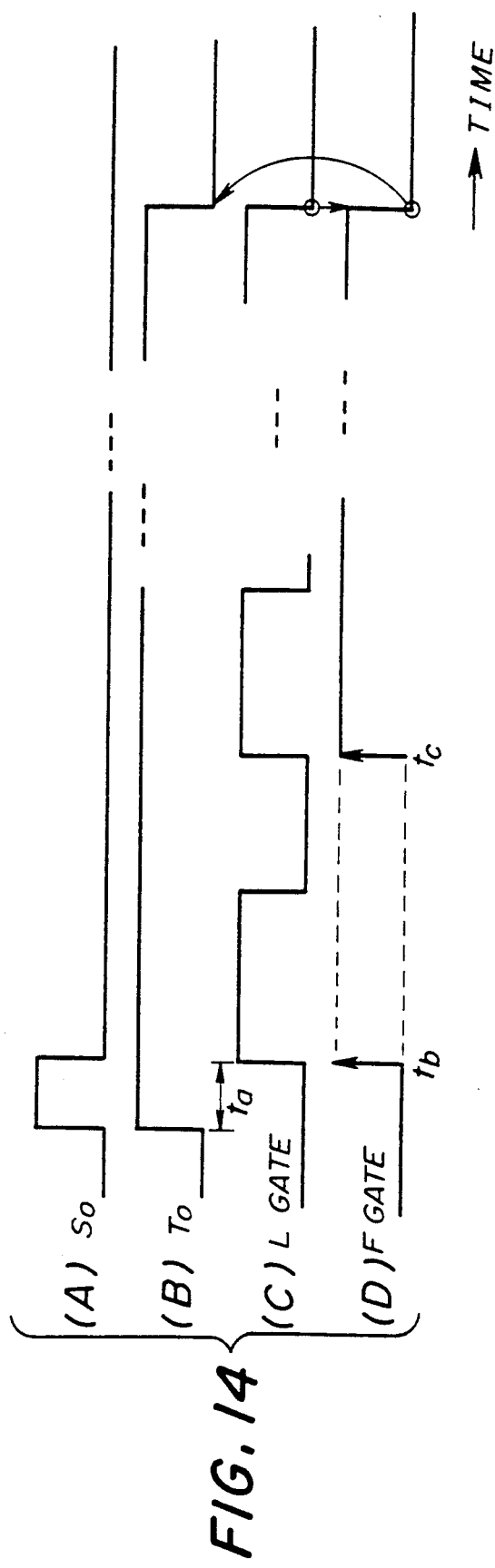

SYNCHRONIZING SIGNAL GENERATING SYSTEM

BACKGROUND OF THE INVENTION

The present invention generally relates to synchronizing signal generating systems, and more particularly to a synchronizing signal generating system for a laser scanner.

Conventionally, a raster scan type optical recording (or write) apparatus is used in a laser printer, a laser platemaker, a laser facsimile machine, a digital copying machine and the like. The recording of the image information is carried out two-dimensionally by a main scan of a laser beam and a sub scan which is realized by feeding a recording medium.

In such an optical recording apparatus, a recording beam generally modulates an output laser beam of a laser light source depending on the image information and the laser beam is deflected by a deflector such as a polygonal mirror to scan the recording medium such as a photosensitive drum. In order to make an appropriate optical scan, a synchronizing signal is used to synchronize the timing of the optical scan. Generally, a light receiving element is arranged at a position outside a range of the image so as to detect the laser beam prior to each scan, and the synchronizing signal is derived from an output of the light receiving element. However, this method merely synchronizes the scan at the start of the scan. As a result, the scan timing or the scanning speed is not necessarily constant at the end of each scan because it is virtually impossible to maintain the rotation of the polygonal mirror constant and mirror surfaces of the polygonal mirror cannot be finished to perfect mirror surfaces. When the scan timing is not constant at the end of each scan, recording positions of dots become inaccurate and the printing quality deteriorates.

Accordingly, there is a proposal to generate the synchronizing signal using a synchronizing beam and a linear encoder (also referred to as grating, grid or scale) which has a plurality of slits, that the intervals of the recorded dots become constant. This proposed method is disclosed in a U.S. Pat. No. 2,389,403. On the other hand, a Japanese Laid-Open Patent Application No. 54-97050 proposes an improvement which facilitates the production of the linear encoder. According to this proposed method, transparent and non-transparent portions are provided in the linear encoder with a pitch which is N times a recording density, and the synchronizing signal is generated by frequency-dividing by 1/N a pulse signal which is derived from a light which is transmitted through the linear encoder using a phase locked loop (PLL) circuit.

As other methods of generating the synchronizing signal, a Japanese Laid-Open Patent Application No. 60-10967 proposes a method of generating the synchronizing signal using a grating and a Japanese Laid-Open Patent Application No. 60-75168 proposes a method of generating the synchronizing signal using a concave mirror array and a plurality of light receiving elements.

FIG. 1 generally shows an arrangement for carrying out the method proposed in the Japanese Laid-Open Patent Application No. 60-10967. FIG. 1 shows a part of an optical recording apparatus which has a laser scanning optical system using a semiconductor laser as a light source.

In FIG. 1, a semiconductor laser 1 emits a recording beam P1 which is modulated by an image signal. The recording beam P1 is deflected by a mirror surface of a rotating polygonal mirror 2 and passes through an $f\theta$-lens 3. The recording beam P1 is then reflected by a mirror 4 and is imaged on a photosensitive body 5. A recording is made on the photosensitive body 5 by a scanning line 6. On the other hand, a synchronizing beam P2 is emitted from a semiconductor laser 7 and impinges the same mirror surface of the polygonal mirror 2 as the recording beam P1. The synchronizing beam P2 hits the mirror surface at a position separated from the position where the recording beam P1 hits this mirror surface. The synchronizing beam P2 passes through the $f\theta$-lens 3 similarly to the recording beam P1.

Because the position of the synchronizing beam P2 is different from that of the recording beam P1 along the vertical direction, the synchronizing beam P2 thereafter passes above the mirror 4 and scans a grating 8 which is located at a position which is optically equivalent to that of the photosensitive body 5. The synchronizing beam P2 which is transmitted through transparent portions of the grating 8 is successively imaged on a plurality of (four in this case) light receiving elements 10a through 10d by a lens array 9. A reference pulse signal Pr is derived from outputs of the light receiving elements 10a through 10d. In other words, the outputs of the light receiving elements 10a through 10d are amplified and added. Accordingly, the reference pulse signal Pr becomes a pulse train which exists for the entire scanning region depending on the arrangement of the transparent and non-transparent portions of the grating 8. The reference pulse signal Pr is shaped if needed and is processed in a PLL circuit which generates a synchronizing signal Po.

FIG. 2 shows a conventional PLL circuit. A PLL circuit 11 comprises a voltage controlled oscillator (VCO) 12, a 1/N frequency divider 14, a phase comparator 14, and a lowpass filter 15. The phase comparator 14 compares the reference pulse signal Pr and an output pulse signal Pb of the frequency divider 13. The frequency divider 13 generates the pulse signal Pb by frequency-dividing an output synchronizing signal Po of the VCO 12 by 1/N. An output signal of the phase comparator 14 is indicative of a phase error between the two compared signals, and is supplied to the VCO 12 via the lowpass filter 15 which eliminates unwanted noise and high-frequency components. Hence, a feedback control is made with respect to the VCO 12 so that the phases of the signals Pr and Pb match. Accordingly, the VCO 12 outputs the synchronizing signal Po which is phase synchronized to the reference pulse signal Pr and is multiplied by N. By use of this PLL circuit 11, it becomes possible to generate the synchronizing signal Po which follows a change in the scanning speed, that is, the frequency change in the reference pulse signal Pr.

When the information which is supplied from a printer controller or a host machine to a driving modulation circuit is modulated and recorded in synchronism with the synchronizing signal Po which is obtained from the PLL circuit 11, it is possible to record the information with a highly accurate dot arrangement. In other words, even when the scanning speed changes during the recording due to unstable rotation of the polygonal mirror, the modulation timing of the semiconductor laser is controlled by the synchronizing signal Po so as to ensure an appropriate optical recording.

Depending on the circuit construction and the like of the PLL circuit 11, the is an approximately constant delay in the response of the PLL circuit 11. For this reason, even when the reference pulse signal Pr is generated, the phase of the signals Pr and Pb do not match immediately. For this reason, the Japanese Laid-Open Patent Application No. 54-97050 proposes to provide a gate for the synchronizing signal. The gate is opened to pass the synchronizing signal only after a lock-up time elapses, where the lock-up time is the time required for the phases of the signals Pr and Pb to match. When the laser beam is modulated in synchronism with the synchronizing signal which is obtained according to this method, starting points (that is, first dots) of the effective scanning lines become correctly aligned in the vertical direction. The effective scanning line becomes longer as the lock-up time becomes shorter, thereby making it convenient for obtaining a high resolution. The Japanese Laid-Open Patent Application No. 54-97050 also proposes resetting the frequency divider 13 by a first photoelectric pulse of the scanning line and forcibly matching the phases of the photoelectric pulse signal and the reference pulse signal Pr. By taking this measure, it is possible to reduce the phase correction quantity and reduce the lock-up time.

In the Japanese Laid-Open Patent Application No. 54-97050, the recording beam is emitted from a blue argon laser and the synchronizing beam is emitted from a red helium laser so as to enable composing and separation of the two beams.

When the output synchronizing signal Po of the PLL circuit 11 is used for synchronizing the recording operation of the laser printer, for example, the reference pulse signal Pr which is supplied to the phase comparator 14 becomes discontinuous between a recording region (scan region) and a non-recording region (non-scan region) as shown in FIG. 3. As a result, the output voltage of the lowpass filter 15 which controls the oscillation frequency of the VCO 12 has a large ripple at the time when the reference pulse signal Pr starts and at the time when the reference pulse signal Pr ceases. The PLL stabilizes to a steady state value with a time constant (pull-in time) which is determined by the loop gain of the PLL. The synchronizing signal Po must be output from the PLL circuit 11 after the PLL stabilizes to the steady state value and is locked.

Because of the pull-in time, the recording region shown in FIG. 3 is set wider than the actual recording width. When generating the reference pulse signal Pr shown in FIG. 3 by use of the grating 8, the pull-in time must be made as short as possible so that the size of the apparatus can be reduced. In other words, in this type of PLL, it is important to lock the PLL within a short time.

Therefore, various measures are taken to lock the PLL within a short time.

According to a first method, the time constant of the lowpass filter 15 is switched when inputting the reference pulse signal Pr.

According to a second method, the input voltage of the VCO 12 is maintained to the voltage at the time when the PLL is locked when the reference pulse signal Pr ceases (the non-recording region).

According to a third method, a pseudo pulse signal is used as proposed in a Japanese Laid-Open Patent Application No. 63-234630. When the frequency of the reference pulse signal Pr greatly changes such as the case where the reference pulse signal Pr ceases, the pseudo pulse signal is generated by frequency-dividing an output pulse signal of an oscillator within a pseudo pulse signal generating circuit. The pseudo pulse signal is supplied to the PLL circuit 11 to compensate for the ceased reference pulse signal Pr.

However, in the cases described hereunder, it is impossible to obtain a stable image by use of the synchronizing signal which is generated by the conventional circuit.

For example, according to the method proposed in the Japanese Laid-Open Patent Application No. 54-97050, the frequency dividing ratio is 1/N and constant in the PLL circuit 11, and it is only possible to obtain a fixed recording density. The recording density is $L \times N$ (dpi) when the pitch of the grating 8 is L (dpi).

On the other hand, Japanese Laid-Open Patent Applications No. 61-66465 and No. 61-66466 propose methods of varying the recording density. The Japanese Laid-Open Patent Application No. 61-66465 varies the recording density by varying the scanning speed of the polygonal mirror and the beam diameter. The Japanese Laid-Open Patent Application No. 61-66466 varies the recording density by varying the synchronizing signal, beam diameter or the feeding speed of the photosensitive body. However, according to these methods, the synchronizing signal is derived from the output of the light receiving element which is arranged at the position outside the range of the image so as to detect the laser beam prior to each scan as described above. As a result, the recording positions of dots become inaccurate and the printing quality deteriorates due to the unstable rotation of the polygonal mirror and the imperfect mirror surfaces of the polygonal mirror. In addition, the Japanese Laid-Open Patent Applications No. 61-66465 and No. 61-66466 also propose to vary the recording density by varying the voltage which is supplied to the VCO 12. But this method results in an unstable synchronizing signal and an unstable image because a voltage change easily occurs due to a temperature change.

According to the method proposed in the Japanese Laid-Open Patent Application No. 54-97050, the dots are recorded at the correct positions only when the temperature is constant. Generally, when an ambient temperature of the PLL circuit changes, a phase error $\phi$ between the reference pulse signal Pr and the pulse signal Pb changes even when the PLL is locked. For example, even when a phase error $\phi_0$ exists between the reference pulse signal Pr shown in FIG. 4(A) and the pulse signal Pb shown in FIG. 4(C) at a temperature $t_0$, the phase error changes to $\phi_1$ when the temperature changes to $t_1$. FIG. 4(B) shows a gate signal Pg and FIG. 4(D) shows the pulse signal Pb at the temperature $t_1$. Therefore, the dots cannot be recorded at the correct positions when the temperature changes, and no measure is taken to guarantee a stable image even when the temperature change occurs.

According to the method proposed in the Japanese Laid-Open Patent Application No. 54-97050, the apparatus becomes bulky because it is necessary to provide a mirror for separating the laser beams emitted from the two light sources and use two gas lasers for the light sources. It is conceivable to use semiconductor lasers with infrared wavelengths as the light sources of the recording beam and the synchronizing beam as proposed in the Japanese Laid-Open Patent Application No. 60-10967, so as to reduce the size of the apparatus. But although the recording beam is modulated depending on the image signal, the synchronizing beam is constantly emitted from the light source after the power source of the laser printer or the like is turned ON so that it is possible to constantly generate the synchronizing signal based on the synchronizing beam. For this reason, when the standby time is long, the photosensitive body, the film and the like are exposed by the flare of the synchronizing beam and makes it impossible to obtain a stable image.

Furthermore, with regard to the measures taken to lock the PLL within a short time, a ringing occurs when the time constant of the lowpass filter is switched according to the first method. The second method is easily affected by the temperature change. In addition, according to the third method, a noise which is generated by the oscillator within the pseudo signal generating circuit affects the PLL even when the reference pulse signal is originally generated, and makes the PLL operation unstable. This results in an unstable image.

SUMMARY OF THE INVENTION

Accordingly, it is a general object of the present invention to provide a novel and useful synchronizing signal generating system in which the problems described above are eliminated.

Another and more specific object of the present invention is to provide a synchronizing signal generating system for a laser scanner, comprising first means for emitting a first laser beam for scanning and a second laser beam for synchronization of scans by the first laser beam, second means including a deflector for scanning a medium by the first laser beam, moving means for moving the medium at a predetermined speed, third means for scanning a grating by the second laser beam, where the grating has bright portions and dark portions alternately arranged along a scanning direction of the second laser beam with a predetermined pitch which is N times a recording density on the medium and N is an integer, a converging optical system for converging the second laser beam transmitted through the grating, a light receiving system for receiving the second laser beam converged by the converging optical system and for generating a reference pulse signal, fourth means for controlling the first means responsive to the reference pulse signal so as to synchronize a scan timing of the first laser beam, where the fourth means comprises a phase locked loop circuit for generating a synchronizing signal which has a frequency N times a frequency of the reference pulse signal in response to the reference pulse signal and control means for controlling a value of N depending on the recording density, and driving means for driving the first means in synchronism with the synchronizing signal depending on input information data. According to the synchronizing signal generating system of the present invention, it is possible to vary the recording density using a simple circuitry and the synchronizing signal is stable even when the recording density is varied. For this reason, it is possible to record the information with a highly accurate dot arrangement and thus record a stable image. It is also possible to vary the recording density while keeping the moving speed of the medium constant, and a stable image can be recorded without modifying process conditions depending on the recording density.

Still another object of the present invention is to provide a synchronizing signal generating system for a laser scanner, comprising first means for emitting a first laser beam for scanning and a second laser beam for synchronization of scans by the first laser beam, second means for scanning a medium by the first laser beam, moving means for moving the medium at a predetermined speed, third means for scanning a grating by the second laser beam, where the grating has bright portions and dark portions alternately arranged along a scanning direction of the second laser beam with a predetermined pitch, a converging optical system for converging the second laser beam transmitted through the grating, a light receiving system for receiving the second laser beam converged by the converging optical system and for generating a reference pulse signal, fourth means for controlling the first means responsive to the reference pulse signal so as to synchronize a scan timing of the first laser beam, where the fourth means comprises a phase locked loop circuit for generating a reference clock signal which has a frequency N times a frequency of the reference pulse signal in response to the reference pulse signal, multiple phase clock generation means for generating a plurality of clock signals having mutually different phases based on the reference pulse signal, and selection means for selectively outputting one of the clock signals as a synchronizing signal, and driving means for driving the first means in synchronism with the synchronizing signal depending on input information data. According to the synchronizing signal generating system of the present invention, it is possible to reduce an error in the recording position of the dots even when the temperature change affects the operation of the phase locked loop circuit. Hence, a stable image can be recorded.

A further object of the present invention is to provide a synchronizing signal generating system for a laser scanner, comprising first means for emitting a first laser beam for scanning and a second laser beam for synchronization of scans by the first laser beam, second means for scanning a medium by the first laser beam, moving means for moving the medium at a predetermined speed, third means for scanning a grating by the second laser beam, the grating having bright portions and dark portions alternately arranged along a scanning direction of the second laser beam with a predetermined pitch, a converging optical system for converging the second laser beam transmitted through the grating, a light receiving system for receiving the second laser beam converged by the converging optical system and for generating a reference pulse signal, fourth means for controlling the first means responsive to the reference pulse signal so as to synchronize a scan timing of the first laser beam and comprising a phase locked loop circuit for generating a synchronizing signal, and driving means for driving the first means in synchronism with the synchronizing signal depending on input information data during a time in which an external recording start signal is received, where the driving means includes an ON/OFF driving circuit for substantially turning OFF the second laser beam during a standby state in which no external recording start signal is received. According to the synchronizing signal generating system of the present invention, it is possible to prevent the photosensitive body, film and the like from being exposed by a flare of the synchronizing beam (second laser beam) during the standby state, and a stable image can be recorded.

Another object of the present invention is to provide a synchronizing signal generating system for a laser scanner, comprising first means for emitting a first laser beam for scanning and a second laser beam for synchronization of scans by the first laser beam, second means for scanning a medium by the first laser beam, moving means for moving the medium at a predetermined speed, third means for scanning a grating by the second laser beam, the grating having bright portions and dark portions alternately arranged along a scanning direction of the second laser beam with a predetermined pitch, a converging optical system for converging the second laser beam transmitted through the grating, a light receiving system for receiving the second laser beam converged by the converging optical system and for generating a reference pulse signal during a scan direction in which the medium scanned by the first laser beam and no synchronizing signal being generated during a non-scan duration in which no scan of the medium is made by the first laser beam, signal generating means including an oscillator for generating a pseudo reference pulse signal, the signal generating means generating the pseudo reference pulse signal during the non-scan direction, where the pseudo reference pulse signal has a predetermined frequency approximately equal to that of the synchronizing signal, selector means for selectively outputting one of the reference pulse signal and the pseudo reference pulse signal so as to output a continuous reference pulse signal, fourth means for controlling the first means responsive to the continuous reference pulse signal so as to synchronize a scan timing of the first laser beam and comprising a phase locked loop circuit for generating a synchronizing signal, driving means for driving the first means in synchronism with the synchronizing signal depending on input information data, and an ON/OFF circuit coupled to the light receiving system and the signal generating means for detecting a discontinuity of the reference pulse signal and for stopping an oscillation of the oscillator when the reference pulse signal is generated from the light receiving system. According to the synchronizing signal generating system of the present invention, it is possible to reduce the pull-in time of the phase locked loop and ensure a stable operation of the phase locked loop circuit by eliminating the undesirable effects of a clock noise which is generated from the oscillator of the signal generating means.

Other objects and further features of the present invention will be apparent from the following detailed description when read in conjunction with the accompanying drawings.

BRIEF DESCRIPTION OF THE DRAWINGS

FIG. 3 shows a reference pulse signal which is supplied to the PLL circuit;

FIGS. 4(A) through 4(D) show signal waveforms for explaining a change in a phase error between a reference pulse signal and a pulse signal caused by a temperature change;

FIGS. 14(A) through 14(D) are timing charts for explaining an operation of the sixth embodiment;

FIG. 15 is a system block diagram for explaining signals shown in FIGS. 14(A) through 14(D);

DESCRIPTION OF THE PREFERRED EMBODIMENTS

Figure 5:
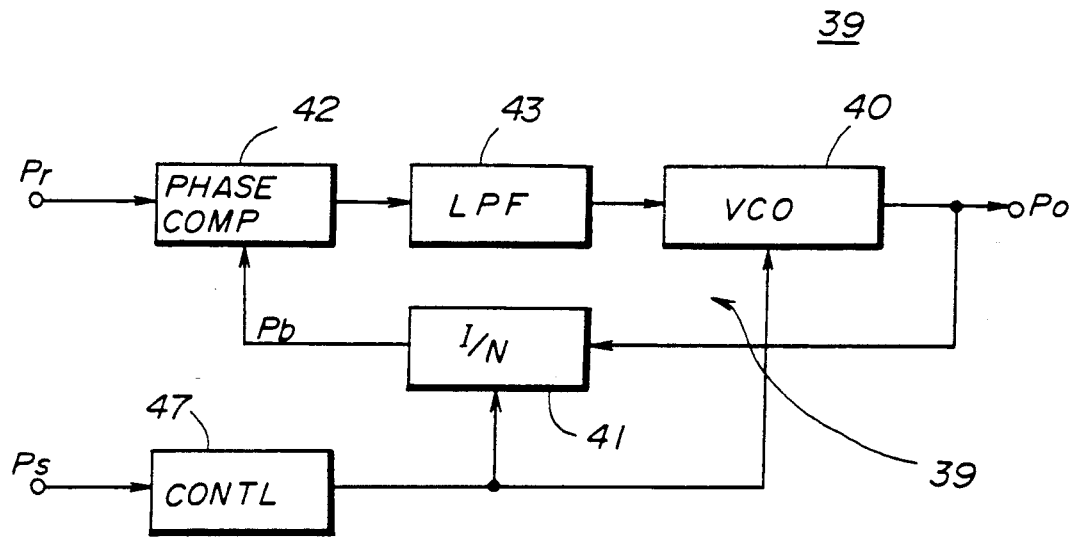
FIG. 5 is a system block diagram showing a first embodiment of a synchronizing signal generating system according to the present invention.

A description will be given of a first embodiment of a synchronizing signal generating system according to the present invention, by referring to FIGS. 5 through 8. FIG. 5 shows the first embodiment and FIG. 6 generally shows a scanning optical system of an optical recording apparatus to which the first embodiment is applied.

Figure 6:
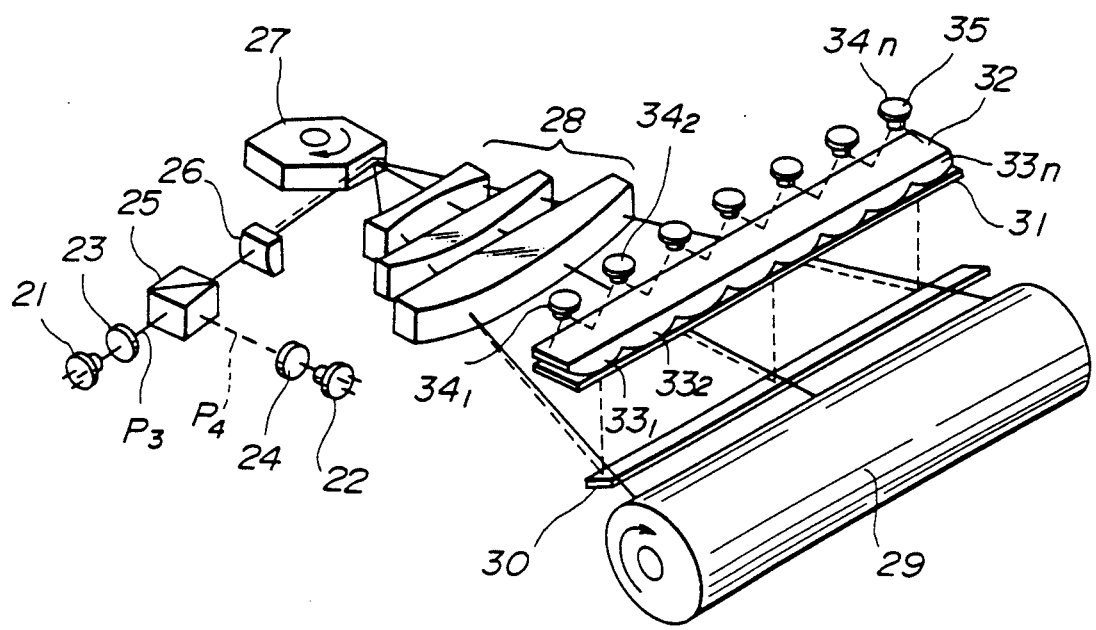
FIG. 6 is a perspective view generally showing a scanning optical system of an optical recording apparatus to which the first embodiment is applied.
Figure 7:
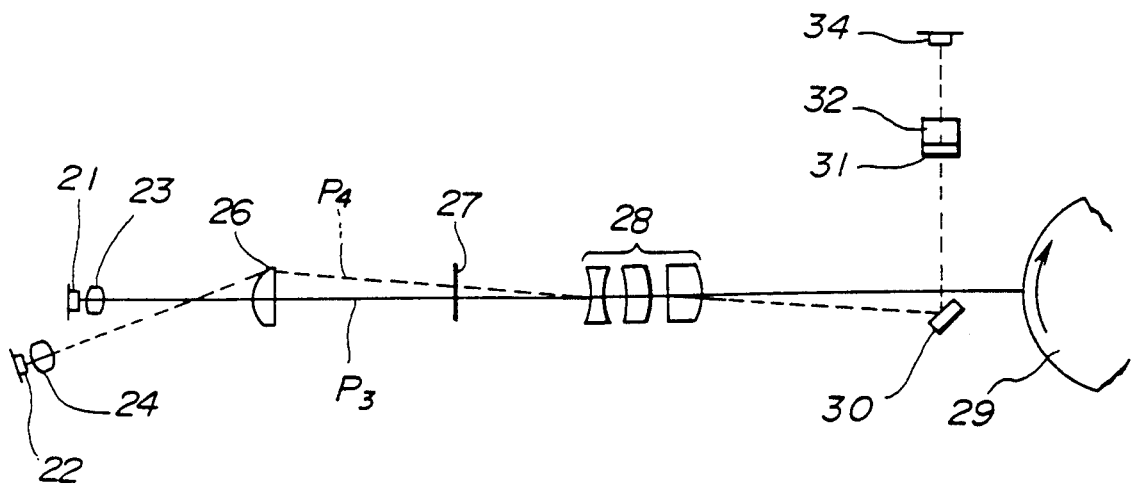
FIG. 7 is a side view showing the scanning optical system shown in FIG. 6.

In FIG. 6, the scanning optical system has two semiconductor lasers 21 and 22. The semiconductor laser 21 emits a recording beam P3 which is modulated by an image signal, and the semiconductor laser 22 emits a synchronizing beam P4 which is used for generating a synchronizing signal. The beams P3 and P4 which are emitted from the semiconductor lasers 21 and 22 are collimated by respective collimator lenses 23 and 24 and reach a deflection beam splitter 25. The recording and synchronizing beams P3 and P4 from the beam splitter 25 are directed to a polygonal mirror 27 by a cylindrical lens 26 which is provided for beam shaping. The cylindrical lens 26 shapes the beam diameter in the sub scanning direction. The recording and synchronizing beams P3 and P4 land at approximately the same positions on the mirror surface of the polygonal mirror 27 but with slightly different incident angles. Therefore, the recording and synchronizing beams P3 and P4 are deflected along slightly different directions. Projections of the deflected recording and synchronizing beams P3 and P4 on a plane perpendicular to a rotary axis of the polygonal mirror 27 intersect.

The recording and synchronizing beams P3 and P4 are deflected as the polygonal mirror 27 rotates and reach an fθ-lens 28. This fθ-lens 28 has an anamorphic structure, that is, a structure such that the focal distance differs between the main and sub scanning direction, so as to correct an error caused by imperfect mirror surfaces of the polygonal mirror 27. The recording beam P3 is formed into a fine spot on a photosensitive recording medium 29 such as a photoconductive body, and this spot exposes and scans the recording medium 29 in the main scanning direction.

On the other hand, the synchronizing beam P4 which is transmitted through the $f\theta$-lens 28 is reflected by a separation mirror 30 and is separated from the recording beam P3. As indicated by a phantom line in FIGS. 6 and 7, an optical axis of the synchronizing beam P4 is slightly inclined in the sub scanning direction with respect to an optical axis of the recording beam P3 which is indicated by a solid line. For this reason, the recording and synchronizing beams P3 and P4 can be separated by the separation mirror 30 after being deflected by the polygonal mirror 27.

The separated synchronizing beams P4 from the separation mirror 30 is directed to a grating 31 and scans the grating 31 as the polygonal mirror 27 rotates. Similarly to the grating 8 shown in FIG. 1, the grating 31 has transparent portions (bright portions) and non-transparent portions (dark portions) which are alternately arranged with a predetermined pitch. For example, the predetermined pitch is N times the recording density, where N is an integer. Because the predetermined pitch is N times the recording density and is relatively coarse, it is easy to produce the grating 31 and synchronizing beam P4 which is transmitted through the grating 31 is virtually unaffected by dust particles and the like adhered on the grating 31. The light intensity of the synchronizing beam P4 which is transmitted through the grating 31 is modulated depending on the arrangement of the transparent and non-transparent portions of the grating 31.

The synchronizing beam P4 which is transmitted through the grating 31 is directed to a lens array 32. This lens array 32 has n condenser lenses $33_1$ through $33_n$ which are contiguously arranged in an array for the entire length of the scanning line. A light receiving system 35 is arranged on one side of the lens array 32 opposite to the grating 31. The light receiving system 35 has n light receiving elements $34_1$ through $34_n$ which are arranged in an array. For example, the light receiving elements $34_1$ through $34_n$ are PIN photodiodes. Each light receiving element $34_i$ is provided with a 1:1 relationship to a corresponding condenser lens $33_i$, so that the light receiving element $34_i$ receives the light which is condensed by the condenser lens $33_i$. Accordingly, the synchronizing beam P4 which is transmitted through the grating 31 is distributed by the lens array 32 and received by the light receiving system 35.

Figure 8:
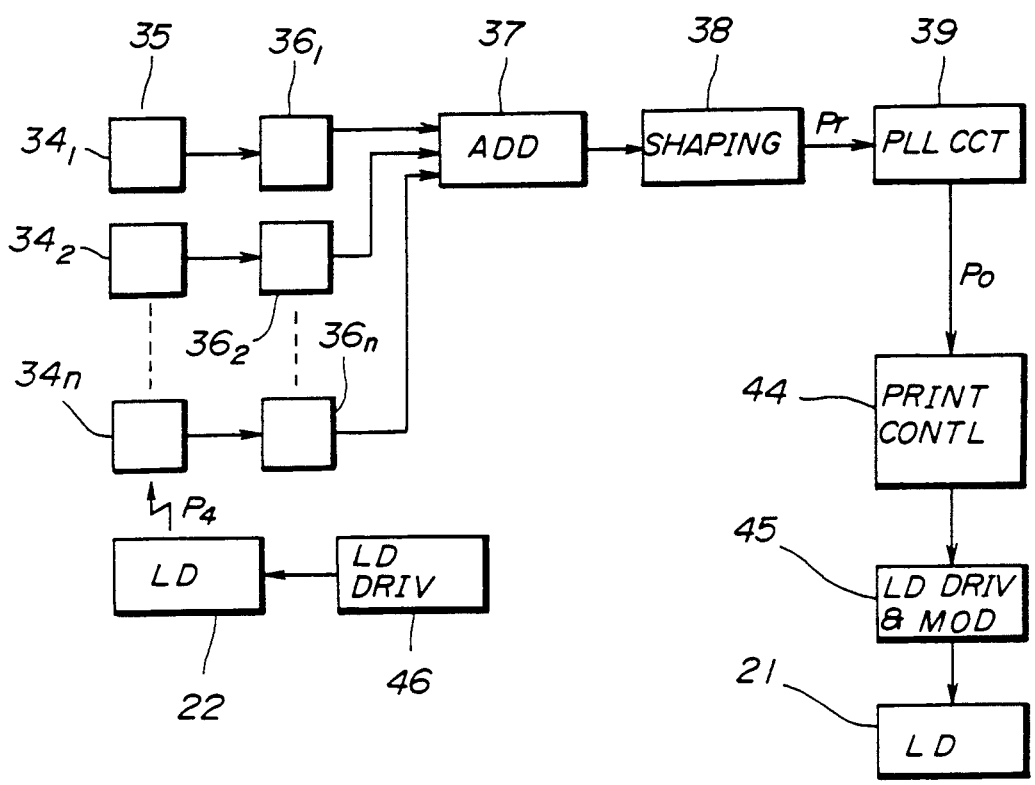
FIG. 8 is a system block diagram showing the optical recording apparatus to which the first embodiment is applied.

The light received by the light receiving elements $34_1$ through $34_n$ are subjected to a photoelectric conversion and output signals of the light receiving elements $34_1$ through $34_n$ are amplified in respective amplifiers $36_1$ through $36_n$ shown in FIG. 8. Output signals of the amplifiers $36_1$ through $36_n$ are added in an adder 37. An output signal of the adder 37 is a pulse train which is obtained for the entire length of the scanning region depending on the arrangement of the transparent and non-transparent portions of the grating 31. The output signal of the adder 37 is shaped into a reference pulse signal Pr in a shaping circuit 38 and is supplied to a PLL circuit 39 which processes the reference pulse signal Pr into a synchronizing signal Po.

FIG. 5 shows the PLL circuit 39. The PLL circuit 39 comprises a VCO 40, a 1/N frequency divider 41, a phase comparator 42, a lowpass filter 43 and a control circuit 47. The frequency divider 41 generates a pulse signal Pb by frequency-dividing the output synchronizing signal Pb of the VCO 40 by 1/N. An output signal of the phase comparator 42 is indicative of a phase error between the two compared signals, and is supplied to the VCO 40 via the lowpass filter 43 which eliminates unwanted noise and high-frequency components. Hence, a feedback control is made with respect to the VCO 40 so that the phases of the signals Pr and Pb match. Accordingly, the VCO 40 outputs the synchronizing signal Po which is phase synchronized to the reference pulse signal Pr and is multiplied by N. By use of this PLL circuit 39, it becomes possible to generate the synchronizing signal Po which follows a change in the scanning speed, that is, the frequency change in the reference pulse signal Pr.

As shown in FIG. 8, a printer controller (or host machine) 44 supplies the image signal to a laser diode driving and modulation circuit 45 in synchronism with the synchronizing signal Po which is received from the PLL circuit 39, and the driving and modulation circuit 45 drives the semiconductor laser 21 so as to modulate the recording beam P3 by the image signal. Even when the scanning speed changes during the recording operation due to an unstable rotation of the polygonal mirror 27 and the like, the modulation timing with respect to the semiconductor laser 21 is controlled depending on the synchronizing signal Po so that the information is recorded with a highly accurate dot arrangement.

In FIG. 8, the semiconductor laser 22 which emits the synchronizing beam P4 is driven by a laser diode driving circuit 46.

In this embodiment, the frequency dividing ratio 1/N of the frequency divider 41 within the PLL circuit 39 is varied depending on the recording density which is set. Specifically, a control circuit 47 receives a recording density setting signal Ps and supplies a control signal to the frequency divider 41 to control the frequency dividing ratio 1/N depending on the recording density setting signal Ps. The recording density setting signal Ps is received from the printer controller 44, for example, and indicates the set recording density.

When the frequency dividing ratio 1/N is varied within a relatively small range such that the PLL can sufficiently follow the change in the frequency dividing ratio 1/N, there is no need to vary the loop gain of the PLL. However, when the frequency dividing ratio 1/N is varied within a relatively large range such that the PLL cannot follow the change in the frequency dividing ratio 1/N, it is necessary to adjust the loop gain of the PLL. In this case, the VCO 40 is controlled responsive to the output control signal of the control circuit 47 so that the loop gain of the PLL is appropriately adjusted depending on the change in the frequency dividing ratio 1/N.

When the transparent and non-transparent portions of the grating 31 are alternately arranged with a pitch L (lines/inch), a recording density $d_M$ in the main scanning direction is determined by the value of N in the PLL circuit 39 as may be seen from the following formula (1).

$$d_M = L \times N \text{ (dots/inch or dpi)} \quad (1)$$

In this embodiment, the value of N is varied depending on the recording density setting signal Ps, and the recording density $d_M$ in the main scanning direction changes depending on the change in the value of N. When L=50 (lines/inch), for example, $d_M$=1200 (dpi)

when N=24, $d_M$=1000 (dpi) when N=20, and $d_M$=800 (dpi) when N=16.

By simply varying the value of N which determines the frequency dividing ratio 1/N of the frequency divider 41 within the PLL circuit 39, it is possible to switch the recording density in the main scanning direction. The synchronizing signal Po which is obtained in this embodiment is stable even when the frequency dividing ratio 1/N is changed, the information is always recorded with a highly accurate dot arrangement, and it is possible to arbitrary switch the recording density in the main scanning direction to a desired recording density.

Figure 9:
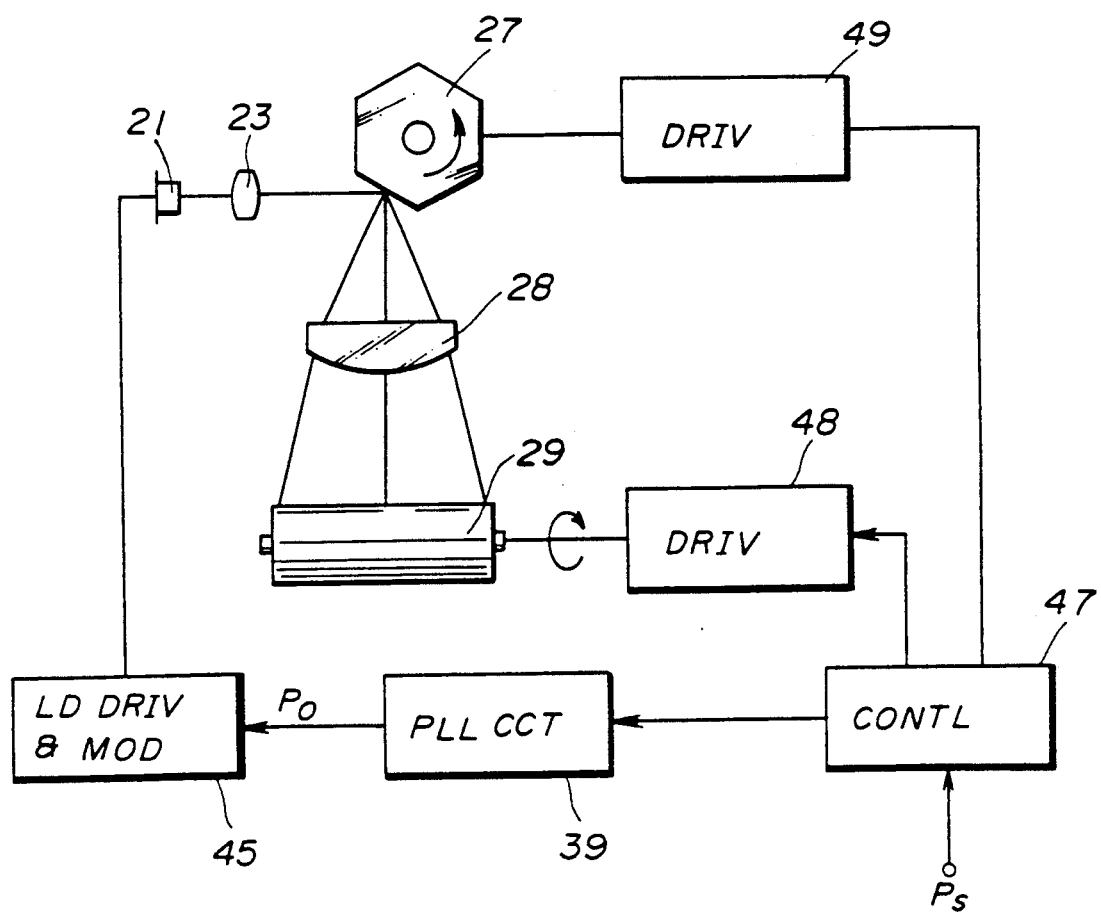
FIG. 9 is a diagram generally showing second and third embodiments of the synchronizing signal generating system according to the present invention.

Next, a description will be given of a second embodiment of the synchronizing signal generating system according to the present invention, by referring to FIG. 9. In FIG. 9, those parts which are essentially the same as those corresponding parts in FIGS. 5 through 8 are designated by the same reference numerals, and a description thereof will be omitted. In this embodiment, it is possible to arbitrarily switch the recording density in the sub scanning direction in addition to switching the recording density in the main scanning direction.

When the scanning speed (deflection frequency) of the deflector (polygonal mirror 27) is denoted by f (Hz) and the constant moving speed of the recording medium 29 is denoted by c (inch/sec), a recording density $d_S$ in the sub scanning direction can be described by the following formula (2).

$$d_S 32 f/v \text{ (dpi)} \qquad (2)$$

The deflector is the polygonal mirror 27 in this embodiment, and the scanning speed f can be described by the following formula (3), where R (rpm) denotes a rotation frequency of the polygonal mirror 27 and m denotes a number of mirror surfaces of the polygonal mirror 27.

$$f=(R/60)\times m \text{ (Hz)} \qquad (3)$$

The following formula (4) is derived by substituting the formula (3) into the formula (2).

$$d_S = m \times R/60v \text{ (dpi)} \qquad (4)$$

On the other hand, a frequency fo (Hz) of the synchronizing signal Po can be described by the following formula (5), where H denotes a recording width in the main scanning direction and E denotes an effective scanning rate, that is, a ratio between one scanning time of the deflector and a time which is actually used for the recording within the scanning time.

$$fo = f \times H \times d_M/E \text{ (Hz)} \qquad (5)$$

The formula (5) can be rewritten as the following formula (6) by substituting the formula (3) into the formula (5).

$$fo = H \times d_M \times R \times m/60E \text{ (Hz)} \qquad (6)$$

In this embodiment, the moving speed v of the recording medium 29 in the formula (4) is varied depending on the recording density setting signal Ps, so that the recording density $d_S$ in the sub scanning direction is variable. Specifically, the control circuit 47 operates as a moving speed varying means for controlling a driving circuit (including a motor) 48 which drives the recording medium 29, and the rotation frequency of the motor of the driving circuit 48 is varied to vary the moving speed v of the recording medium 29.

According to this embodiment, it is possible to vary the recording density $d_S$ in the sub scanning direction by varying the moving speed v of the recording medium 29 in addition to varying the recording density $d_M$ in the main scanning direction.

Next, a description will be given of a third embodiment of the synchronizing signal generating system according to the present invention. This embodiment will also be described with reference to FIG. 9. In this embodiment, the scanning frequency f of the polygonal mirror 27 and more particularly the rotation frequency R of the polygonal mirror 27 is varied in the formula (4) depending on the recording density setting signal Ps so as to vary the recording density $d_S$ in the sub scanning direction. In this case, the control circuit 47 operates as a deflector frequency varying means for varying the rotation frequency of the motor of the driving circuit 49 so as to vary the rotation frequency R of the polygonal mirror 27.

According to this embodiment, the recording density $d_S$ in the sub scanning direction is varied by varying the scanning frequency f (rotation frequency R) of the polygonal mirror 27 while the moving speed v of the recording medium 29 is kept constant. For this reason, when the recording medium 29 is used for an image formation by an electrophotography process, it is possible to obtain a stable image without modifying the process conditions depending on the recording density.

In the second and third embodiments, the moving speed v and the rotation frequency R in the formula (4) can both be made variable in order to switch the recording density $d_S$ in the sub scanning direction.

When both the moving speed v and the rotation frequency R are made variable, it is possible to record the information in response to a constant synchronizing signal even when the recording density changes. For this reason, it is possible to simplify the structure of a part (controller, interface and the like) which transmits and receives the image signal (recording information) between the host machine and the optical recording apparatus. For example, the following Table shows that the frequency (MHz) of the synchronizing signal Po becomes constant when both the moving speed v and the rotation frequency R are made variable. In the Table, (1) denotes a case where the second embodiment is employed, (2) denotes a case where the third embodiment is employed, and (3) denotes a case where the second and third embodiments are combined and both the moving speed v and the rotation frequency R are made variable. In addition, the effective scanning rate E=0.5, the rotation frequency R=4000 (rpm), the number m of mirror surfaces of the polygonal mirror 27 is m=8, and the moving speed v=0.533 (inch/sec). The recording density $d_M \times d_S$ in the main and sub scanning directions is one of D1=1000 (dpi)×1000 (dpi), D2=800 (dpi)×800 (dpi) and D3=1200 (dpi)×1200 (dpi).

TABLE

| Case | R (rpm) | | | V (inch/sec) | | | Po (MHz) | | |
|---|---|---|---|---|---|---|---|---|---|
| | (1) | (2) | (3) | (1) | (2) | (3) | (1) | (2) | (3) |
| D1 | 4000 | 4000 | 4000 | 0.533 | 0.533 | 0.533 | 12.8 | 12.8 | 12.8 |
| D2 | 4000 | 3198 | 5000 | 0.667 | 0.533 | 0.833 | 10.24 | 8.17 | 12.8 |
| D3 | 4000 | 4197 | 3333 | 0.444 | 0.533 | 0.370 | 15.36 | 18.42 | 12.8 |

Figure 10:
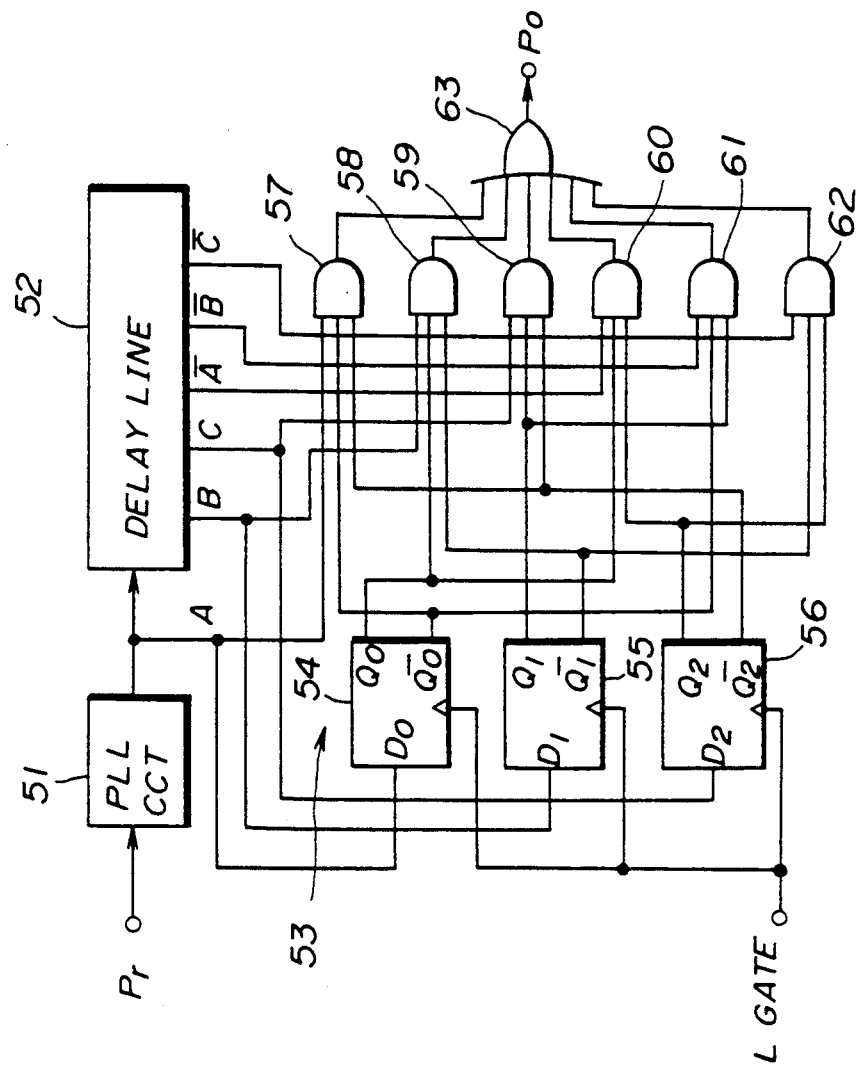
FIG. 10 is a system block diagram showing a fourth embodiment of the synchronizing signal generating system according to the present invention.

Next, a description will be given of a fourth embodiment of the synchronizing signal generating system according to the present invention, by referring to FIGS. 10 and 11(A) through 11(G). In FIG. 10, a PLL circuit 51 which receives the reference pulse signal Pr may have the structure shown in FIG. 2, for example. An output reference clock signal A of the PLL circuit 51 is supplied to a delay line 52 which operates as a multiple phase clock generation means. As shown in FIGS. 11(A) through 11(F), the delay line 52 generates clock signals B, C, $\overline{A}$, $\overline{B}$ and $\overline{C}$ which have phases which mutually differ by $\pi/3$ based on the reference clock signal A which is synchronized to the reference pulse signal Pr and corresponds to the synchronizing signal Po shown in FIG. 2. Hence, there are six clock signals A, B, C, $\overline{A}$, $\overline{B}$ and $\overline{C}$ of six mutually different phases.

Figure 11:
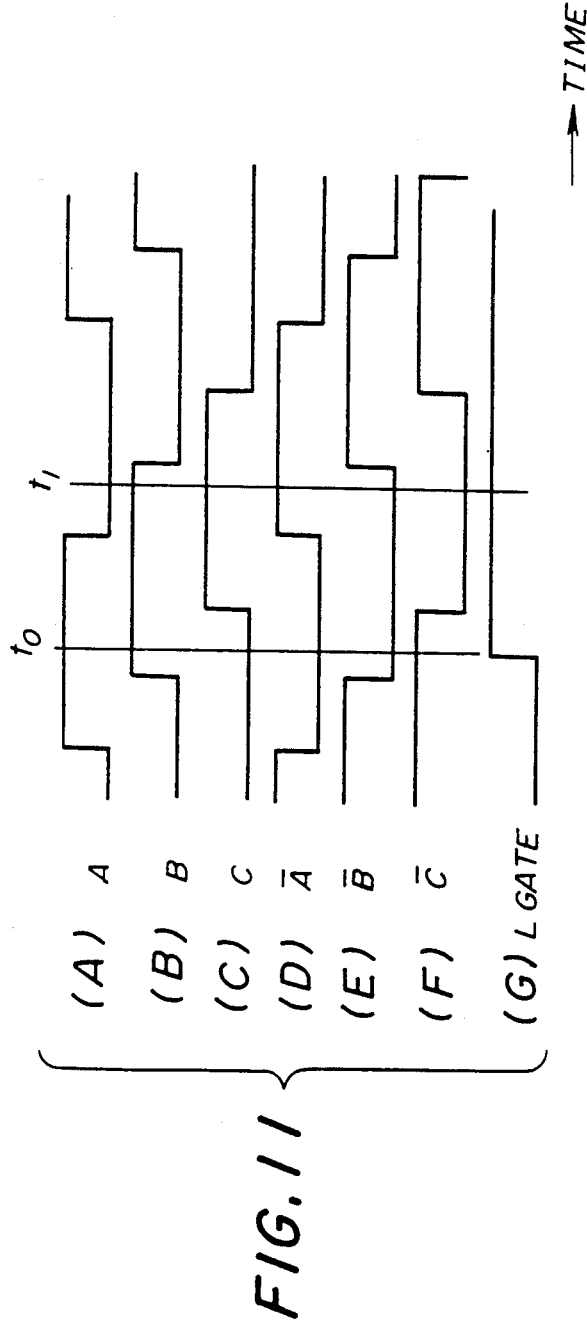
FIGS. 11(A) through 11(G) are timing charts for explaining an operation of the fourth embodiment.

The six clock signals A, B, C, $\overline{A}$, $\overline{B}$ and $\overline{C}$ are supplied to a clock selection circuit 53 which operates as a selection means for selectively outputting one of the six clock signals A, B, C, $\overline{A}$, $\overline{B}$ and $\overline{C}$ as the synchronizing signal Po. The clock selection circuit 53 comprises three D flip-flops 54 through 56, six AND gates 57 through 62, and an OR gate 63 which are connected a shown in FIG. 10. The clock signals A, B and C are respectively applied to data terminals D of the flip-flops 54 through 56, and a recording signal LGate shown in FIG. 11(G) is applied to clock terminals of the flip-flops 54 through 56. Each of the AND gates 57 through 62 receive three signals out of the six clock signals A, B, C, $\overline{A}$, $\overline{B}$ and $\overline{C}$ and six output signals Q0, Q1, Q2, $\overline{Q0}$, $\overline{Q1}$ and $\overline{Q2}$ of the flip-flops 54 through 56. The OR gate 63 receives output signals of the AND gates 57 through 62, and an output signal of the OR gate 63 is selectively output as the synchronizing signal Po which has a rising edge immediately after a rising edge of the recording signal LGate.

For the sake of convenience, it is assumed that the recording signal LGate shown in FIG. 11(G) which is synchronized to the reference pulse signal Pr rises at a time t0. In this case, the output signals Q0, Q1 and Q2 of the flip-flops 54 through 56 become Q0=H, Q1=H and Q2=L, where "H" and "L" respectively denote high and low levels of the signals. Out of the AND gates 57 though 62, only the AND gate 59 can produce an output in this state. Hence, the clock signal C which has a rising edge immediately after the rising edge of the recording signal LGate is selectively output from the OR gate 63 as the synchronizing signal Po.

On the other hand, when the recording signal LGate rises at a time $t_1$ shown in FIG. 7(G), only the AND gate 61 can produce an output. In this case, the clock signal $\overline{B}$ which has a rising edge immediately after the rising edge of the recording signal LGate is selectively output from the OR gate 63 as the synchronizing signal Po.

Therefore, out of the six clock signals A, B, C, $\overline{A}$, $\overline{B}$ and $\overline{C}$ which are generated from the output of the PLL circuit 51, the clock signal which has a rising edge immediately after the rising edge of the recording signal LGate is selectively output as the synchronizing signal Po. For this reason, even when a phase error occurs in the PLL circuit 51 between the reference pulse signal Pr and the pulse signal Pb due to a temperature change or the like, it is possible to suppress the error in the recording position of the dots to 1/6 dot or less.

In this embodiment, the clock signals used have six mutually different phases. However, it is possible to reduce the phase error between the clock signals by using clock signals with eight, ten or more mutually different phases. In addition, when selectively outputting one of the clock signals as the synchronizing signal Po, it is possible to selectively output the clock signal which has a falling edge immediately after the rising edge of the recording signal LGate.

Figure 12:
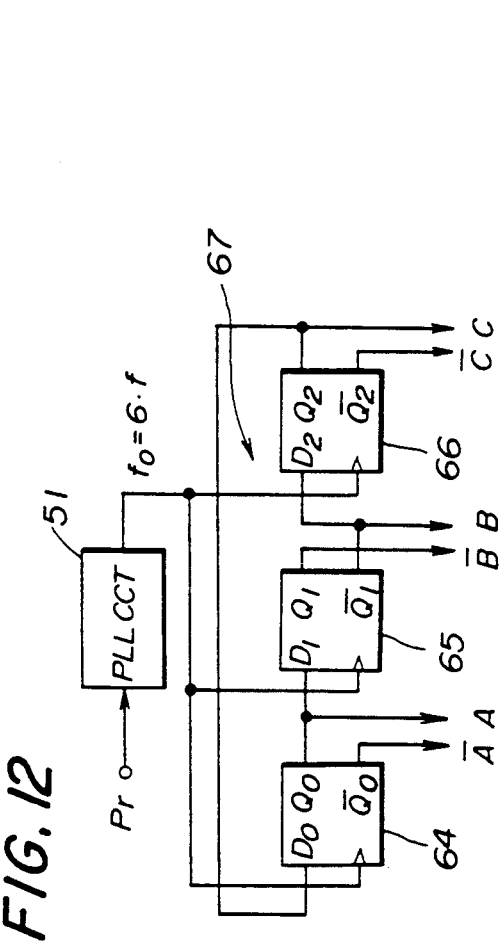
FIG. 12 is a system block diagram showing an essential part of a fifth embodiment of the synchronizing signal generating system according to the present invention.

Next, a description will be given of a fifth embodiment of the synchronizing signal generating system according to the present invention, by referring to FIG. 12. In this embodiment, a frequency dividing circuit 67 constitutes the multiple phase clock generation means. As shown in FIG. 12, the frequency dividing circuit 67 comprises three D flip-flops 64 through 66 which frequency-divide the output reference clock signal A of the PLL circuit 51 into the six clock signals A, B, C, $\overline{A}$, $\overline{B}$ and $\overline{C}$. The clock selection circuit 53 shown in FIG. 10 may be used to selectively output one of the clock signals A, B, C, $\overline{A}$, $\overline{B}$ and $\overline{C}$. According to this embodiment, there is no need to make the clock oscillation frequency correspond to the delay quantity.

Figure 1:
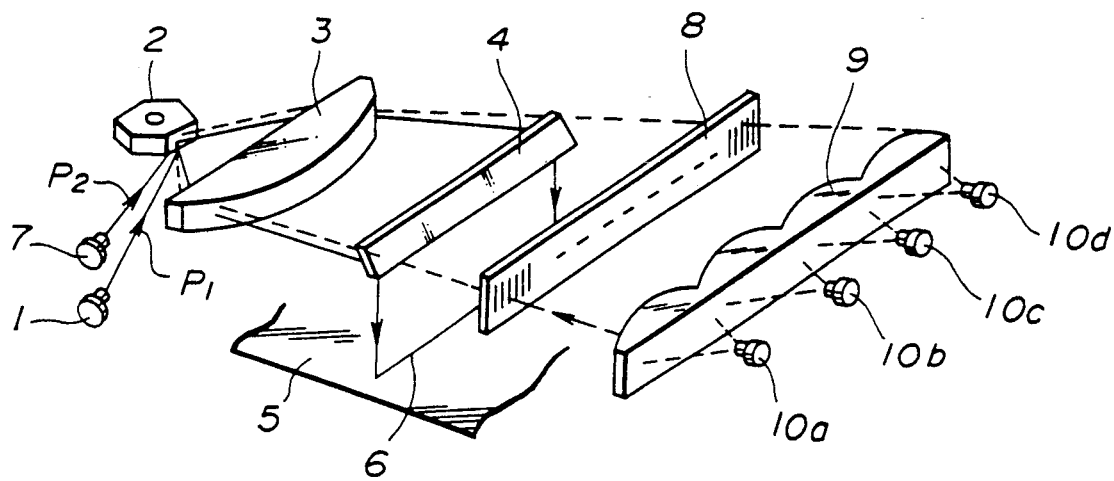
FIG. 1 is a perspective view generally showing a part of a conventional optical recording apparatus.

Next, a description will be given of a sixth embodiment of the synchronizing signal generating system according to the present invention, by referring to FIGS. 13 through 15. In this embodiment, the recording optical system of the laser printer may have the structure shown in FIG. 1, for example. Hence, in FIG. 13, those parts which are the same as those corresponding parts in FIG. 1 are designated by the same reference numerals.

Figure 13:
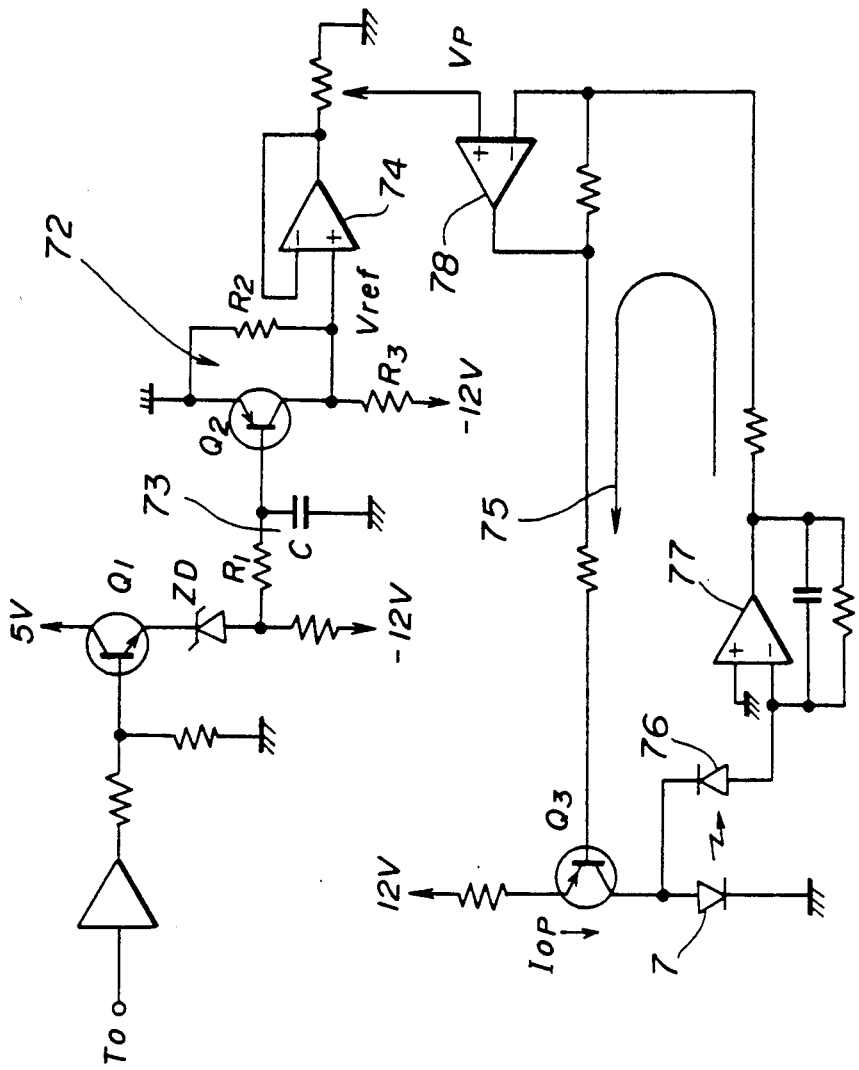
FIG. 13 is a circuit diagram showing an essential part of a sixth embodiment of the synchronizing signal generating system according to the present invention.

In FIG. 13, the semiconductor laser 7 is controlled by an ON/OFF driving circuit 72. First, a synchronizing beam turn-ON signal T0 which rises in synchronism with an external recording start signal S0 is applied to a base of a transistor Q1 and this transistor Q1 turns ON. FIGS. 14(A) and 14(B) respectively show the signals S0 and T0. A time constant circuit 73 made up of a resistor R1 and a capacitor C is coupled to an emitter of the transistor Q1 via a Zenner diode ZD. A transistor Q2 is connected to the time constant circuit 73. A resistor R2 (for example, 5 k$\Omega$) and a resistor R3 (for example, 1 k$\Omega$) which divide a power source voltage of $-12$ V are connected to the transistor Q2, and a node between the resistors R2 and R3 is connected to non-inverting input terminal of a comparator 74 so as to supply a reference voltage Vref to the non-inverting input terminal. An output of the comparator 74 is coupled to a closed loop circuit 75 via a variable resistor VR. This closed loop circuit 75 is provided with respect to the semiconductor laser 7.

The closed loop circuit 75 comprises a transistor Q3, a photodiode 76, a current-voltage converter 77 and a comparator 78 which are connected in the form of a loop. The transistor Q3 is connected between the semiconductor laser 7 and the power source which supplies the $-12$ V and supplies a driving current Iop. The current-voltage converter 77 subjects to a current-voltage conversion a photocurrent which is generated by the photodiode 76 which receives a part of the synchronizing beam which is emitted from the semiconductor laser 7. The comparator 78 compares an output of the current-voltage converter 77 and a potential Vp which is determined by the output of the comparator 74.

When the recording start signal S0 is generated and the laser printer is in a standby state, the signal T0 rises and the transistor Q1 turns ON. When the time constant circuit 73 charges with a time constant determined by the resistor R1 and the capacitor C, the transistor Q2 turns OFF. In this state, the reference voltage Vref which is supplied to the comparator 74 is approximately −10 V. When the reference voltage Vref is −10 V, the closed loop circuit 75 operates so as to increase the driving current Iop. Hence, the semiconductor laser 7 turns ON and the synchronizing beam is emitted from the semiconductor laser 7.

In this embodiment, a sequence control means carries out a control so that a recording signal FGate shown in FIG. 14(D) rises after the synchronizing beam stabilizes and reaches a predetermined light intensity. In other words, the recording signal FGate shown in FIG. 14(D) rises in synchronism with a recording signal LGate shown in FIG. 14(C) after a time td which corresponds to a sum of a time it takes for the reference voltage Vref to stablize and a loop response time of the closed loop circuit 75 which operates to control the semiconductor laser 7 to emit the synchronizing beam with a set light intensity. The recording signal FGate rises at a time tc when ta<td and rises at a time tb when ta>td, where ta denotes a time between rising edges of the signals To and LGate.

The recording signal LGate indicates a recording region (width) of one line and is generated by counting the reference pulse signal Ref.P. The recording signal LGate is generated after the generation of the signal To. The recording signal FGate indicates a recording region (length) of one page and corresponds to a number of lines in one page. FIG. 15 shows a system for generating the signals shown in FIGS. 14(A) through 14(D). A host machine 101 generates the signal So, and a controller 102 generates the signal To based on the signal So. The signal To is supplied to the laser diode driving circuit 46 which outputs the reference pulse signal Ref.P. A timing generator 103 generates the recording signals LGate and FGate based on the reference pulse signal Ref.P and supplies the recording signals LGate and FGate to the laser diode driving and modulation circuit 45.

Because the recording operation starts after the synchronizing beam stabilizes, the reference pulse signal Pr which is supplied to the PLL circuit 11 becomes stable. As a result, the synchronizing signal Po becomes stable and the recording positions of dots become accurate. The actual recording signal FGate falls when a predetermined number of lines are recorded, that is, when a predetermined number of pulses of the recording signal LGate is counted. At the same time, the signal To falls.

When the signal To falls, the transistor Q1 turns OFF and the time constant circuit 73 discharges with the time constant which is determined by the resistor R1 and the capacitor C. In addition, the transistor Q2 turns ON and the reference voltage Vref which is supplied to the comparator 74 becomes approximately 0 V. Accordingly, after the signal To falls, the semiconductor laser 7 is turned OFF and no synchronizing beam is generated. This state in which the semiconductor laser 7 is OFF continues until the next signal So is generated. Hence, the photosensitive body 5 is prevented from being exposed by the flare of the synchronizing beam in the standby state. In addition, the ON/OFF switching of the semiconductor laser 7 in this embodiment is made by varying the reference voltage Vref which is supplied to the comparator 74 between −10 V and approximately 0 V. For this reason, the circuit construction of the driving circuit 72 is simple and it is possible to deterioration of the semiconductor laser 7.

In this embodiment, the operation is described for the case where one page is recorded. However, when successively recording a plurality of pages, it is possible to use an independent control signal to keep the semiconductor laser 7 ON. In this case, the level of the signal To ma be kept at the high level. Furthermore, instead of completely turning OFF the semiconductor laser 7, it is also possible to control the light intensity of the synchronizing beam to an extremely small value.

Figure 16:
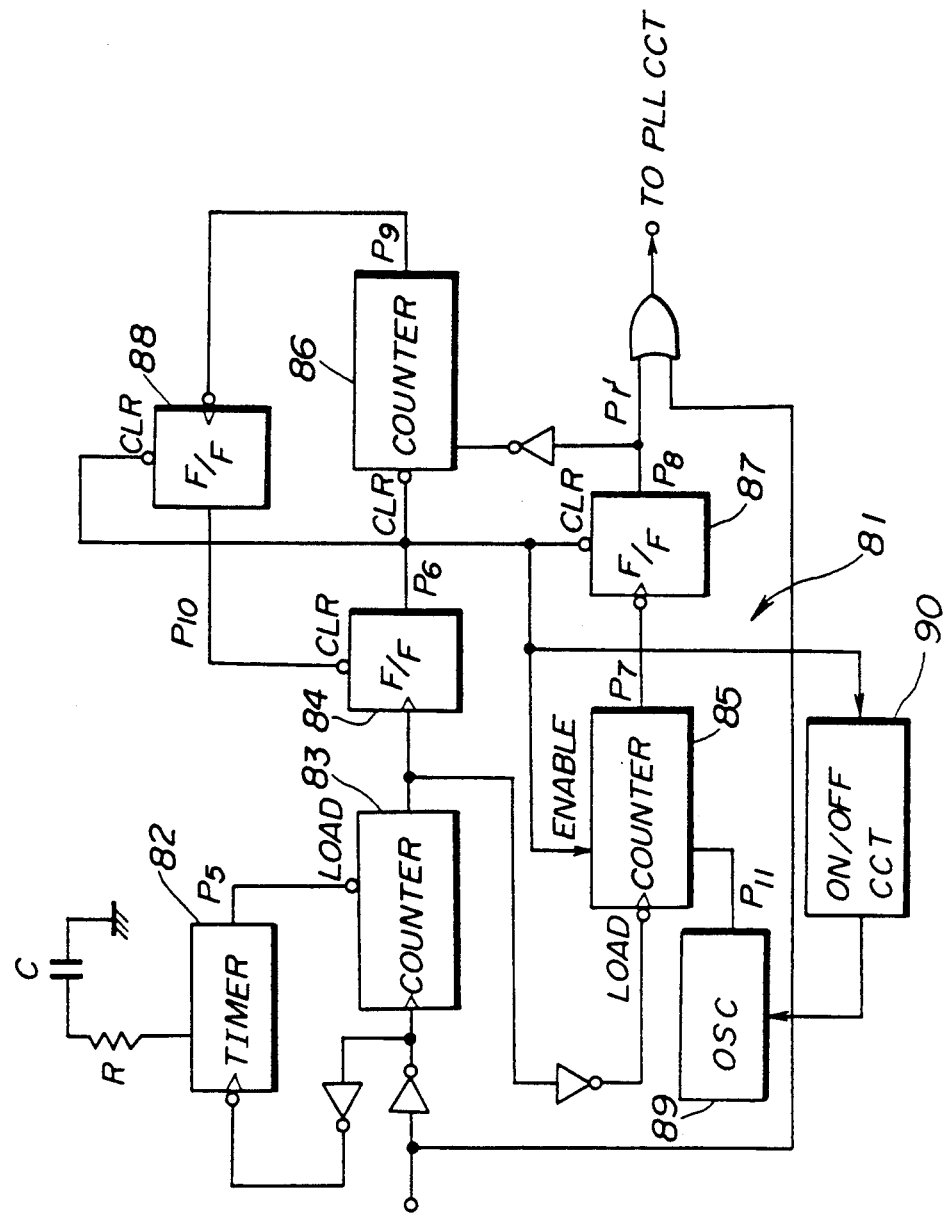
FIG. 16 is a system block diagram showing an essential part of a seventh embodiment of the synchronizing signal generating system according to the present invention.

Next, a description will be given of a seventh embodiment of the synchronizing signal generating system according to the present invention, by referring to FIGS. 16 and 17(A) through 17(I). In FIG. 16, those parts which are essentially the same as those corresponding parts in FIGS. 1 through 3 are designated by the same reference numerals, and a description thereof will be omitted.

Figure 2:
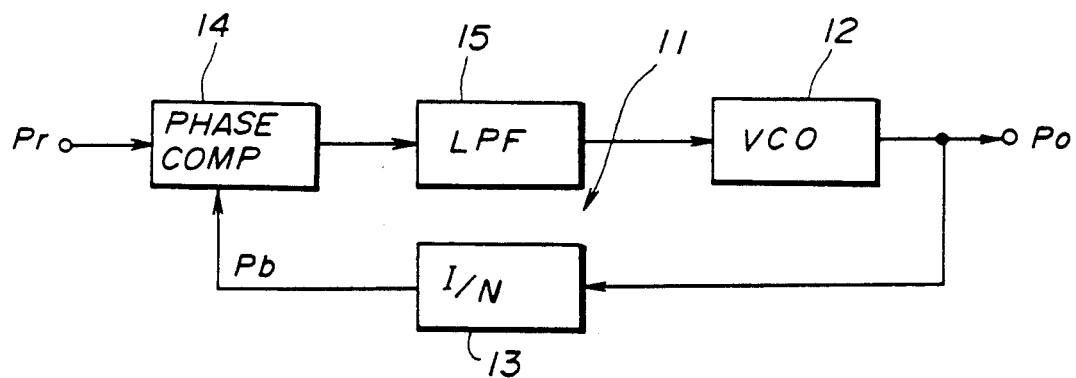
FIG. 2 is a system block diagram showing a conventional PLL circuit.
Figure 17:
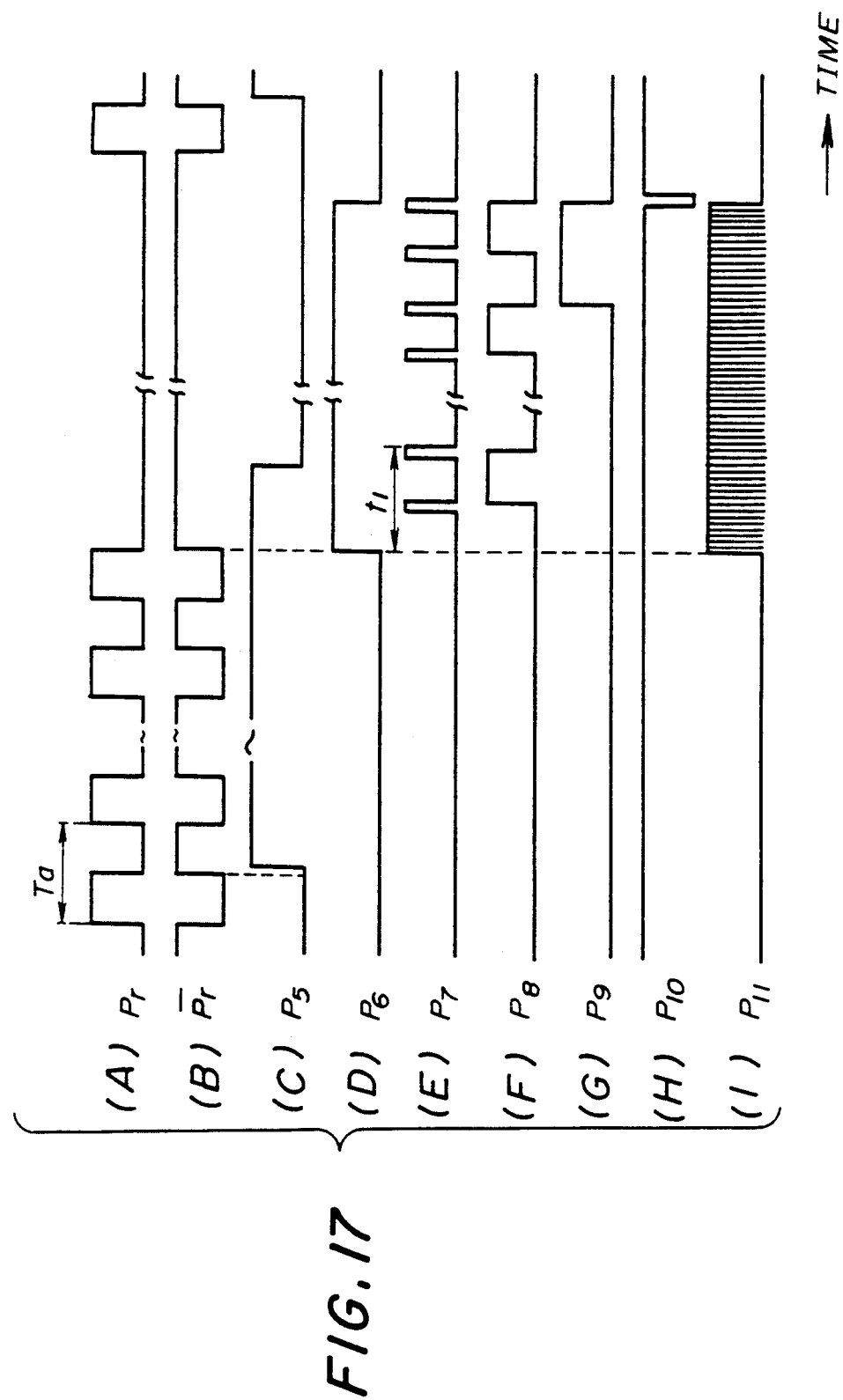
FIGS. 17(A) through 17(I) are timing charts for explaining an operation of the seventh embodiment.

In this embodiment, a pseudo pulse signal generating circuit 81 shown in FIG. 16 is provided in a stage preceding the PLL circuit 11 shown in FIG. 2. When the synchronizing beam is transmitted through the grating 8 and the reference pulse signal Pr shown in FIG. 17(A) is generated, a timer 82 outputs a timer output signal P5 shown in FIG. 17(C) in response to a first falling edge of the reference pulse signal Pr. FIG. 17(B) shows an inverted signal $\overline{Pr}$ of the reference pulse signal Pr. When the period of the reference pulse signal Pr is denoted by Ta and a time constant T82 of the timer 82 is T82=CR, Ta<T82 where C and R respectively denote the resistance and the capacitance of a resistor and a capacitor which are externally coupled to the timer 82. When the timer output signal P5 is output from the timer 82, a first counter 83 is enabled. In the enabled state, the first counter 83 counts falling edges of the reference pulse signal Pr which is generated in the recording region. When a counted value in the first counter 83 reaches a predetermined value which is determined by the grating 8, a first flip-flop 84 supplies a signal P6 shown in FIG. 17(D) to an ON/OFF circuit 90 in response to an output of the first counter 83. A rising edge of the signal P6 indicates the end of the recording region, that is, the transition from the recording region to the non-recording region in which the reference pulse signal Pr ceases, and the ON/OFF circuit 90 is turned ON in response to the rising edge of the signal P6. The signal P6 is also supplied to second and third counters 85 and 86 and second and third flip-flops 87 and 88.

An oscillator 89 starts to oscillate in response to an output signal of the ON/OF circuit 90 which turns ON when the signal P6 rises. The oscillator 89 oscillates with a sufficient resolution with respect to the reference pulse signal Pr, and an output oscillation signal P11 shown in FIG. 17(I) of the oscillator 89 is formed into a pulse signal P7 shown in FIG. 17(E) by the second counter 85 which carries out a frequency division. The second flip-flop 87 inverts an output signal thereof every time the signal P7 is received from the second counter 85, and generates a pulse signal P8 shown in FIG. 17(F) which has a period which is identical to or approximately the same as the period Ta of the reference pulse signal Pr. The pulse signal P8 is used as a pseudo pulse signal Pr′ which is supplied to the PLL circuit 11 during a time which corresponds to the non-recording region. The pull-in time of the PLL is positively shortened because the pseudo pulse signal P8 is supplied to the PLL circuit 11 when the reference pulse signal Pr ceases.

On the other hand, the third counter 86 counts the pulse signal P8 which is generated during the time corresponding to the non-recording region. When a counted value in the third counter 86 reaches a predetermined value, the third counter 86 outputs a signal P9 shown in FIG. 17(G) and the first flip-flop 84 is cleared in response to a clear signal P10 shown in FIG. 17(H) which is output from the third flip-flop 88 responsive to the signal P9. Accordingly, the signal P6 falls. This falling edge of the signal P6 indicates the end of the non-recording region, that is, a transition from the non-recording region to the recording region in which the reference pulse signal Pr is generated. The ON/OFF circuit 90 turns OFF in response to the falling edge of the signal P6. As a result, the oscillation of the oscillator 89 is stopped in the recording region in which the reference pulse signal Pr is generated. Therefore, during the time in which the reference pulse signal Pr is generated, only the clock component of the PLL circuit 11 itself exists, and the clock noise of the oscillator 89 does not affect the PLL circuit 11. The stable operation of the PLL circuit 11 can thus be guaranteed.

The present invention is not limited to the application to the optical systems of the described embodiments. For example, the present invention is applicable to any of the optical systems disclosed in a U.S. Pat. No. 4,837,588 the disclosure of which is hereby incorporated by reference.

Further, the present invention is not limited to these embodiments, but various variations and modifications may be made without departing from the scope of the present invention.

What is claimed is:

1. A synchronizing signal generating system for a laser scanner, said synchronizing signal generating system comprising:
   first means for emitting a first laser beam for scanning and a second laser beam for synchronization of scans by said first laser beam;
   second means including a deflector for scanning a medium by said first laser beam;
   moving means for moving said medium at a predetermined speed;
   third means for scanning a grating by said second laser beam, said grating having bright portions and dark portions alternately arranged along a scanning direction of said second laser beam with a predetermined pitch which is N times a recording density on said medium, where N is an integer;
   a converging optical system for converging said second laser beam transmitted through said grating;
   a light receiving system for receiving said second laser beam converged by said converging optical system and for generating a reference pulse signal;
   fourth means for controlling said first means responsive to said reference pulse signal so as to synchronize a scan timing of said first laser beam, said fourth means comprising a phase locked loop circuit for generating a synchronizing signal which has a frequency N times a frequency of said reference pulse signal in response to said reference pulse signal, and control means for controlling a value of N depending on the recording density; and
   driving means for driving said first means in synchronism with said synchronizing signal depending on input information data.

2. The synchronizing signal generating system as claimed in claim 1 wherein said phase locked loop circuit comprises a voltage controlled oscillator for outputting the synchronizing signal, a frequency divider for frequency-dividing the output synchronizing signal of said voltage controlled oscillator by 1/N, a phase comparator for comparing a phase of said reference pulse signal and an output signal of said frequency divider and for outputting a phase error signal indicative of a phase error between the two compared signals, a lowpass filter for eliminating high-frequency components from the phase error signal, said lowpass filter outputting a signal which controls an oscillation frequency of said voltage controlled oscillator.

3. The synchronizing signal generating system as claimed in claim 2 wherein said control means generates a control signal in response to an external recording density setting signal which indicates the recording density, said control signal being supplied to said frequency divider to control the value of N depending on the external recording density setting signal.

4. The synchronizing signal generating system as claimed in claim 3 wherein said control signal is supplied to said voltage controlled oscillator to control a loop gain of said phase locked loop circuit when a change in the value of N exceeds a predetermined range in which said phase locked loop circuit can follow the change in the value of N.

5. The synchronizing signal generating system as claimed in claim 1 which further comprises moving speed varying means for controlling said moving means to vary a moving speed of the medium in response to said recording density setting signal.

6. The synchronizing signal generating system as claimed in claim 1 which further comprises deflector frequency varying means for varying a deflection frequency of said deflector in response to said recording density setting signal.

7. The synchronizing signal generating system as claimed in claim 6 wherein said deflector is made up of a polygonal mirror, and said deflector frequency varying means varies a rotation frequency of said polygonal mirror.

8. A synchronizing signal generating system for a laser scanner, said synchronizing signal generating system comprising:
   first means for emitting a first laser beam for scanning and a second laser beam for synchronization of scans by said first laser beam;
   second means for scanning a medium by said first laser beam;
   moving means for moving said medium at a predetermined speed;
   third means for scanning a grating by said second laser beam, said grating having bright portions and dark portions alternately arranged along a scanning direction of said second laser beam with a predetermined pitch;
   a converging optical system for converging said second laser beam transmitted through said grating;
   a light receiving system for receiving said second laser beam converged by said converging optical system and for generating a reference pulse signal;
   fourth means for controlling said first means responsive to said reference pulse signal so as to synchronize a scan timing of said first laser beam, said fourth means comprising a phase locked loop circuit for generating a reference clock signal which has a frequency N times a frequency of said reference pulse signal in response to said reference pulse signal, multiple phase clock generation means for generating a plurality of clock signals having mutually different phases based on said reference pulse signal, and selection means for selectively outputting one of said clock signals as a synchronizing signal; and driving means for driving said first means in synchronism with said synchronizing signal depending on input information data.

9. The synchronizing signal generating system as claimed in claim 8 wherein said phase locked loop circuit comprises a voltage controlled oscillator for outputting the synchronizing signal, a frequency divider for frequency-dividing the output synchronizing signal of said voltage controlled oscillator by 1/N, a phase comparator for comparing a phase of said reference pulse signal and an output signal of said frequency divider and for outputting a phase error signal indicative of a phase error between the two compared signals, a lowpass filter for eliminating high-frequency components from the phase error signal, said lowpass filter outputting a signal which controls an oscillation frequency of said voltage controlled oscillator.

10. The synchronizing signal generating system as claimed in claim 8 wherein said multiple phase clock generation means comprises a delay line.

11. The synchronizing signal generating system as claimed in claim 8 wherein said multiple phase clock generation means comprises a frequency dividing circuit.

12. A synchronizing signal generating system for a laser scanner, said synchronizing signal generating system comprising:

first means for emitting a first laser beam for scanning and a second laser beam for synchronization of scans by said first laser beam;
second means for scanning a medium by said first laser beam;
moving means for moving said medium at a predetermined speed;
third means for scanning a grating by said second laser beam, said grating having bright portions and dark portions alternately arranged along a scanning direction of said second laser beam with a predetermined pitch;
a converging optical system for converging said second laser beam transmitted through said grating;
a light receiving system for receiving said second laser beam converged by said converging optical system and for generating a reference pulse signal;
fourth means for controlling said first means responsive to said reference pulse signal so as to synchronize a scan timing of said first laser beam, said fourth means comprising a phase locked loop circuit for generating a synchronizing signal; and
driving means for driving said first means in synchronism with said synchronizing signal depending on input information data during a time in which an external recording start signal is received,
said driving means including an ON/OFF driving circuit for substantially turning OFF said second laser beam during a standby state in which no external recording start signal is received.

13. The synchronizing signal generating system as claimed in claim 12 wherein said ON/OFF driving circuit substantially turns OFF said second laser beam by varying a potential which drives said first means and determines a light intensity of said second laser beam.

14. The synchronizing signal generating system as claimed in claim 12 which further comprises sequence control means coupled to said driving means for starting a recording operation by said first laser beam after a light intensity of said second laser beam reaches a predetermined stable intensity.

15. A synchronizing signal generating system for a laser scanner, said synchronizing signal generating system comprising:

first means for emitting a first laser beam for scanning and a second laser beam for synchronization of scans by said first laser beam;
second means for scanning a medium by said first laser beam;
moving means for moving said medium at a predetermined speed;
third means for scanning a grating by said second laser beam, said grating having bright portions and dark portions alternately arranged along a scanning direction of said second laser beam with a predetermined pitch;
a converging optical system for converging said second laser beam transmitted through said grating;
a light receiving system for receiving said second laser beam converged by said converging optical system and for generating a reference pulse signal, said reference pulse signal being generated during a scan direction in which said medium scanned by said first laser beam and no synchronizing signal being generated during a non-scan duration in which no scan of said medium is made by said first laser beam;
signal generating means including an oscillator for generating a pseudo reference pulse signal, said signal generating means generating said pseudo reference pulse signal during said non-scan direction, said pseudo reference pulse signal having a predetermined frequency approximately equal to that of said synchronizing signal;
selector means for selectively outputting one of said reference pulse signal and said pseudo reference pulse signal so as to output a continuous reference pulse signal;
fourth means for controlling said first means responsive to said continuous reference pulse signal so as to synchronize a scan timing of said first laser beam, said fourth means comprising a phase locked loop circuit for generating a synchronizing signal;
driving means for driving said first means in synchronism with said synchronizing signal depending on input information data; and
an ON/OFF circuit coupled to said light receiving system and said signal generating means for detecting a discontinuity of said reference pulse signal and for stopping an oscillation of said oscillator when said reference pulse signal is generated from said light receiving system.

16. The synchronizing signal generating system as claimed in claim 15 wherein said predetermined frequency is an integral multiple of a scanning frequency of said first laser beam with respect to said medium.

17. The synchronizing signal generating system as claimed in claim 15 wherein said signal generating means generates said pseudo reference pulse signal having a phase which coincides with that of said reference pulse signal.

* * * * *